United States Patent [19]
Ogawa et al.

[11] 3,731,052
[45] May 1, 1973

[54] ELECTRON BEAM WELDING APPARATUS

[75] Inventors: Yasuhide Ogawa; Yutaka Kawase; Makoto Takada; Akira Fujioka; Hideki Kobayashi, all of Tokyo, Japan

[73] Assignee: Nippon Electric Company, Limited, Tokyo, Japan

[22] Filed: June 2, 1971

[21] Appl. No.: 149,219

[30] Foreign Application Priority Data

June 6, 1970  Japan..............................45/49332

[52] U.S. Cl............................................219/121 EB
[51] Int. Cl. ...............................................B23k 15/00
[58] Field of Search..................219/121 EB, 121 EM, 219/121 R; 13/31; 250/49.5 B, 49.5 R, 45.9

[56] References Cited

UNITED STATES PATENTS

| | | | |
|---|---|---|---|
| 3,222,496 | 12/1965 | Windebank | 219/121 EB |
| 3,535,487 | 10/1970 | Hinrichs et al. | 219/121 EB |
| 3,592,995 | 7/1971 | Hinrichs | 219/121 EB |

Primary Examiner—J. V. Truhe
Assistant Examiner—Gale R. Peterson
Attorney—Marn & Jangarathis

[57] ABSTRACT

Electron beam welding apparatus is disclosed in accordance with the teachings of the present invention wherein a plurality of welding chambers adapted to receive work pieces to be welded is supported in a radially outward direction by a table. A cover, concentric with the table, overlies said table and includes an electron beam source and evacuating means mounted thereon. Sealing members are interposed between the table and the cover to define an annular space therebetween, which space is maintained in a radially sealed relationship. The table is rotated relative to the cover such that the welding chambers rotate within the annular space. A low pressure condition is produced in each welding chamber when the welding chamber is rotated into registration with the evacuating means; and the work piece contained in the low pressure environment of said welding chamber is subject to a beam of electrons when said welding chamber is rotated into registration with the electron beam source.

2 Claims, 1 Drawing Figure

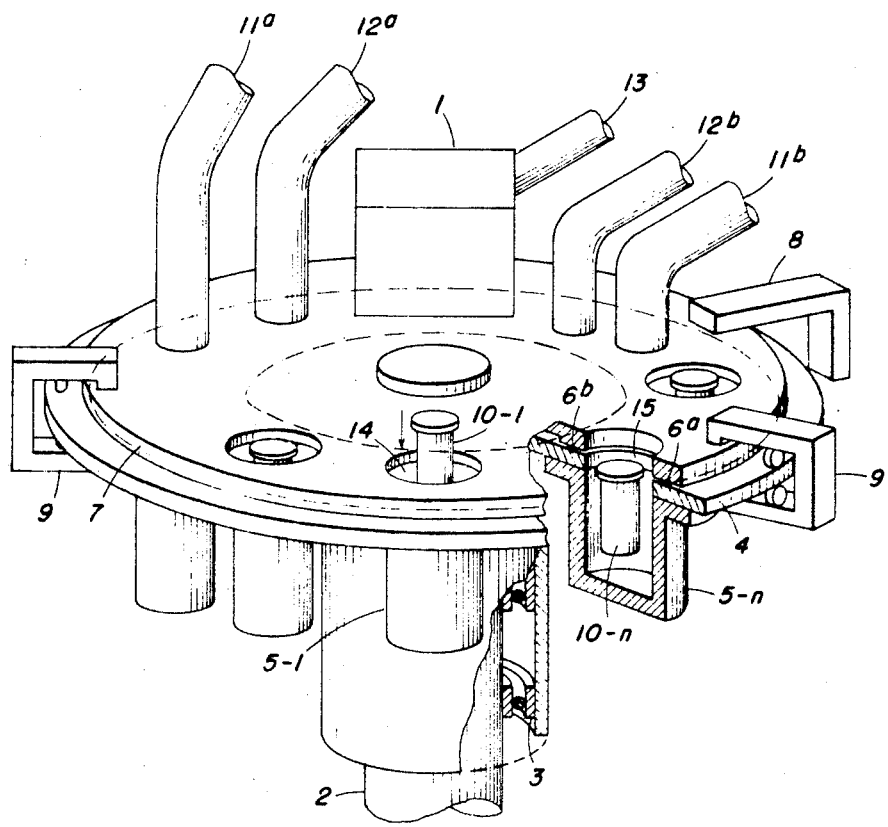
INVENTORS
Yasuhide Ogawa
Yutaka Kawase
Makoto Takada
Akira Fujioka
Hideki Kobayashi
BY Marn & Jangarathis
ATTORNEYS

ELECTRON BEAM WELDING APPARATUS

This invention relates to an electron beam welder for successively welding work pieces by directing an electron beam onto said pieces, which pieces are placed in a low pressure, low vacuum, or high vacuum environment.

In conventional electron beam welding devices, the electron beam source is, in general, disposed in a low pressure or a high vacuum environment. Therefore, if the work pieces to be welded by the electrons projected thereon are placed in an environment exhibiting an ambient vacuum or pressure much different from the pressure of the environment wherein the electron source is placed, apparatus must be provided for sustaining this pressure difference. It has been found that such apparatus heretofore utilized by the prior art is of such complex construction that the operation of the welder is unnecessarily complicated. Moreover, if the work pieces are placed in an environment of relatively high pressure, the electron beam projected thereto will be scattered to a considerable extent, before it reaches the pieces, by the molecules of the environmental gas. Hence, the energy density of the electron beam is substantially reduced, with the resulting deleterious consequences of diminishing the effective range of the electron beam and the depth of weld for the pieces. Accordingly, to overcome the foregoing disadvantages, the pieces to be welded are preferably placed, in most cases, in a space exhibiting the lowest possible pressure.

However, in order to reduce the ambient pressure, the work pieces must first be placed in a suitable vessel, which then must be evacuated for a considerable length of time by a vacuum pump connected thereto. The time necessary for evacuation is a serious problem because it prohibits the execution of an efficient welding operation whenever a large number of work pieces are to be welded by the electron beam. Usually, where the pieces are welded by the electron beam in a low pressure environment, the time required to obtain a satisfactory low pressure by evacuation is at least equal to, and in many cases more than, the net welding time, i.e., the period of actual projection of the electron beam. Accordingly, the total time required for a welding operation amounts to twice or more than the net welding period during which the pieces are subjected to the electron beam. The prior art has proposed various techniques for minimizing this essentially inutile time. One such technique contemplates the evacuation of a vessel containing one work piece while, at the same time, another work piece is welded. However, most of the devices hitherto employed to carry out this technique exhibit a complicated construction, are massive in design, expensive, and require the services of an inordinately skilled operator.

Therefore, it is an object of the present invention to provide an electron beam welder wherein a number of work pieces can be successively welded under reduced pressure.

It is another object of this invention to provide electron beam welding apparatus characterized by efficient operation thereof.

A further object of this invention is to provide an electron beam welding device wherein a welding compartment is maintained in a reduced pressure condition that is substantially secure from significant leakage.

An additional object of this invention is to provide relatively simple and inexpensive means to minimize the leakage of a reduced pressure welding environment.

Yet another object of this invention is to provide electron beam welding apparatus wherein the time delay inherent in a welding operation and attributed to reducing the pressure of a welding environment to a satisfactory level is significantly reduced.

A still further object of the present invention is to provide electron beam welding apparatus suitable for rapidly welding a number of work pieces in a successive manner and particularly adapted for assembly line usage.

Various other objects and advantages of the invention will become clear from the following detailed description of an exemplary embodiment thereof and the novel features will be particularly pointed out in connection with the appended claims.

In accordance with this invention, electron beam welding apparatus is provided wherein a table, rotatable with respect to a fixed plate, supports a plurality of chambers adapted to receive work pieces to be welded; concentric sealing means are interposed between the table and the plate to define an annular space within which the chambers rotate; and evacuation tubes disposed in the plate serve to reduce the pressure within each chamber prior to the rotation of the chamber into electron beam receiving position.

The invention will be more clearly understood by reference to the following detailed description of an exemplary embodiment thereof in conjunction with the accompanying drawing which is a perspective view, partly in section, of one embodiment of electron beam welding apparatus.

Referring now to the drawing, the electron beam welding apparatus in accordance with the present invention includes an electron beam source 1 wherein the electron beam is generated, accelerated, focussed, deflected, and otherwise processed. A rotatable table 4 is supported on a main shaft 2 through bearings 3. The rotatable table 4 supports a plurality of welding chambers 5-1, . . . , 5-n, wherein n may be any convenient integer for which the present invention is adapted for receiving work pieces 10 to be welded. The chambers are disposed in a radially outward direction and are adapted to be intermittently rotated with table 4 by an indexing device (not shown) to obtain precise angular positions. On the upper surface of the rotatable table 4, two endless concentric vacuum sealing members 6a and 6b, such as O rings, of different radius are disposed, thereby defining an annular space within which the welding chambers 5 rotate. On the sealing members 6a, 6b, a cover 7 concentric with table 4, is fixed through suitable fixing means 8 so that the rotatable table 4 may be slidingly rotated along the sealing members 6a and 6b relative to the cover 7. It will soon become apparent that cover 7 may rotate with respect to table 4. The force exerted on the sealing members is adjusted by roller members 9 which enable relative rotation between table 4 and cover 7 while maintaining the annular space defined by the sealing members in a radially sealed relationship. An opening 14 is provided on the cover 7 for passing the work piece 10–1 therethrough and into chamber 5–1 when the chamber is in registration with the opening. Another opening 15 is provided on the cover 7 for removal of the welded work piece 10-n. In addition, evacuating tubes 11a, 11b, 12a, and 12b, and the electron beam source 1 are arranged on cover 7 in overlying relationship with respect to the annular space defined by sealing members 6a and 6b and are adapted for direct communication with the welding chambers 5 of the rotatable table 4 when said welding chambers rotate into registration therewith.

In operation, a work piece 10-1 is placed in a welding chamber 5-1 which is positioned beneath the receiving opening 14. The chamber 5-1 is successively positioned beneath the evacuating tubes 11a and 12a to enable the ambient pressure thereof to be reduced to a suitable level as the rotatable table 4 is indexed. Chamber 5-1 is then rotated into electron beam receiving position under the electron beam source 1. During the indexing of rotatable table 4 and, correspondingly, chamber 5-1, the leakage into chamber 5-1 is very small because leakage can occur only along the direction of the rotation through the annular space defined by the sealing members 6a and 6b and between the rotatable table 4 and the cover 7. It is observed, however, that leakage does not take place radially over the sealing members. Accordingly, the desired degree of vacuum characterized by minimal leakage is readily attained in the welding chamber 5-1 rotated under the electron beam source 1 to allow the welding operation for the work piece placed therein. The work pieces thus welded pass under the evacuating tubes 11b and 12b in accordance with the rotation of table 4 and chamber 5-1, and then removed from the chamber through the exit opening 15.

With the above-described electron beam welding apparatus, it should be understood that the electron beam is applied to one work piece while the mounting of other work pieces, evacuation of other chambers, leakage, and removal of work piece 10n from exit opening 15 are simultaneously taking place. It should be particularly noted that radial leakage of ambient atmosphere into an evacuated chamber 5 is completely avoided by the concentrically disposed sealing members of different radii arranged in a plane which serves to substantially reduce the load on the evacuating system. Accordingly, the time required to effect one rotation on table 4, i.e., the total time required for a welding operation, is a function of the net welding period. The operational efficiency of the present invention can, therefore, be elevated to five or six times that of the conventional welder utilized by the prior art wherein the sequence of introducing the work piece into the welding chamber, evacuating the chamber, welding the work piece, leakage, and removing the welded pieces from the chamber has been performed with a single welding chamber. The invention thus provides welding apparatus having suitable characteristics for assembly line applications.

What is claimed is:

1. Electron beam apparatus for welding work pieces one at a time, comprising:

a rotatable table having a plurality of openings spaced in a peripheral area thereof;

a cover fixedly spaced above said table in substantial co-extensive relation therewith and having at least first and second openings spaced in a first peripheral area overlaying said table peripheral area;

means for rotating said table relative to said cover to register successive pairs of said table openings with said first and second cover openings at a given time;

a pair of annular sealing members disposed in concentric relation between adjacent surfaces of said table and said cover on an axis coaxial with axes of said table and said cover for forming between said surfaces an annular space communicating with said table and cover openings;

a plurality of chambers having closed and open opposite ends, said chambers at said open ends thereof attached to another surface of said table at said table openings to register therewith for communication with said annular space; whereby successive pairs of said chamber open ends are registerable with said first and second cover openings as said table is rotated for loading said work pieces through one of said first and second cover openings into said chambers one at a time and for removing welded work pieces through the other of said first and second cover openings from said chambers one at a time;

at least one evacuating tube attached to said cover at a third opening formed in said cover at a second peripheral area thereof overlaying said table peripheral area, said third cover opening spaced from said first and second cover openings to communicate with said annular space for gradually removing from said chambers ambient air leaked thereinto through aid annular space as said chambers loaded with said work pieces are passed under said tube as said table is rotated; and electron beam means attached to said cover at a fourth opening formed in said cover at a third peripheral area thereof overlaying said table peripheral area, said fourth cover opening spaced from said first, second and third cover openings to communicate with said annular space for enabling said beam means to project an electron beam through said fourth cover opening and said annular space onto said work pieces as said chamber open ends are respectively registered with said fourth cover opening to weld said work pieces one at a time as said table is rotated.

2. The electron beam apparatus according to claim 1 which includes a second evacuating tube attached to said cover at a fifth opening formed in said cover at a fourth peripheral area thereof overlaying said table peripheral area, said fifth opening spaced from said first, second, third and fourth cover openings for disposing said second tube on a side of said beam means opposite to the side of said beam means proximate to said third cover opening, said fifth cover opening communicating with said annulars space for additionally removing ambient air from said chambers as said chambers loaded with said welded work pieces are passed under said second tube as said table is rotated.

* * * * *